April 14, 1959     D. J. SIMKIN     2,881,920
SETTLER WITH PADDLE

Filed June 11, 1956                                               2 Sheets-Sheet 1

INVENTOR:
DONALD J. SIMKIN
BY: *Oswald H. Milmore*
HIS ATTORNEY

April 14, 1959 D. J. SIMKIN 2,881,920
SETTLER WITH PADDLE
Filed June 11, 1956 2 Sheets-Sheet 2
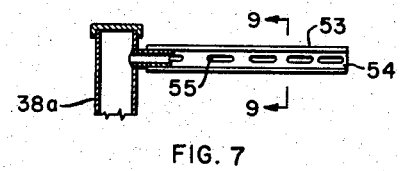
FIG. 7
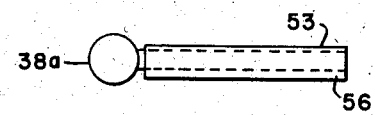
FIG. 8
FIG. 9
FIG. 12
FIG. 13
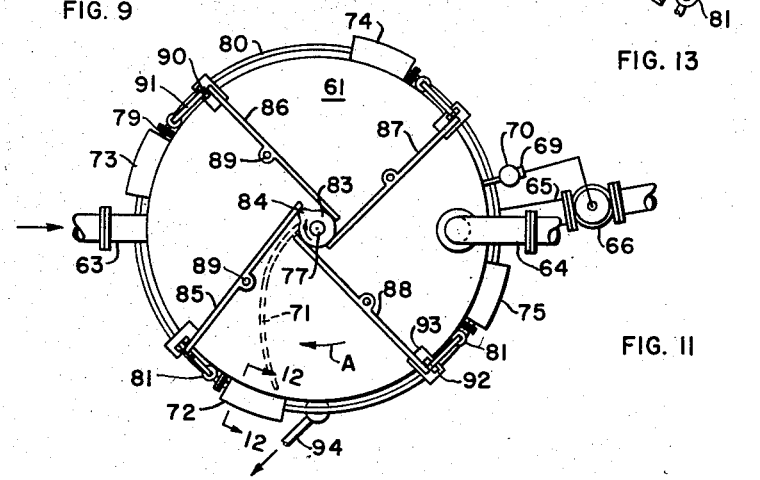
FIG. 11
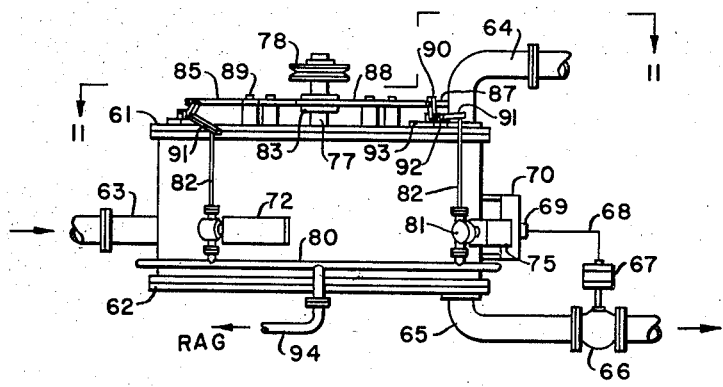
FIG. 10
INVENTOR:
DONALD J. SIMKIN
BY: *Oswald H. Milmore*
HIS ATTORNEY

2,881,920

SETTLER WITH PADDLE

Donald J. Simkin, Berkeley, Calif., assignor to Shell Development Company, New York, N.Y., a corporation of Delaware Application June 11, 1956, Serial No. 590,757

9 Claims. (Cl. 210—114)

This invention relates to apparatus for settling a mixture or dispersion of immiscible liquid phases and is, more particularly, concerned with a gravity settler provided with means for coalescing dispersed liquid in the region of the interface between the layers of settled liquid phases and/or for removing rag from the interface. In one aspect the invention relates to an internal settler of a contactor of the type known as a rotating disc contactor.

In the region of the interface of a settler there is frequently a multitude of uncoalesced droplets of the dispersed phase. The permissible rate of liquid withdrawal of the said phase from the settler is limited by the rate at which the said droplets coalesce. Also, mixtures of liquid phases containing rag-forming substances are frequently encountered. These phenomena occur, for example, in the extraction of liquid with selective solvents. Substances which collect as a third phase, known as rag, at the interface level between the settled principal phases are or behave as if they had a density intermediate to those of the settled phases; this behaviour may, however, be due to the chemical nature of the substances, as when their molecular structure is such that one functional group of the molecule is attracted to one of the phases and another part to the other phase. The rag acts as a barrier and prevents the facile passage of the principal phases through the interface. For example, droplets of the lighter principal phase dispersed within the heavy layer and ascending therethrough are held up at the interface and are thereby prevented from entering the upper layer until a sufficiently large globule of the lighter phase has been accumulated; at that time the globule breaks through the rag, but may carry some adhering heavy phase with it. It is evident that the rag is detrimental to the operation of a settler.

As specific examples of process wherein slow coalescence of droplets at the interface and rag formation is a problem may be mentioned the extraction of certain lubricating oils with furfural, in which small quantities of asphaltenes tend to form a rag; the extraction of lemon or orange oil with a pair of immiscible solvents such as alcohol and propane, wherein slimy substances separate at the interface; and the extraction of crude mixtures of sodium alkyl sulfates produced by the sulfation product of cracked wax olefines of 10–18 carbon atoms using gasoline as the selective solvent to extract the unreacted hydrocarbons and polymers, wherein a slimy layer containing iron compounds as well as other compounds appears as a slimy layer at the interface.

Various expedients have heretofore been used to promote coalescence and to remove the rag or to mitigate the effects of it. The former include coalescing mats, and the latter the draw-off of a small amount of the liquid from the interface and the introduction of the feed stream into the settler horizontal at the interface level to create horizontal currents which carry the rag toward the rag discharge. These solutions have been only partly effective and/or have been accompanied by other problems, such as fouling of the coalescing mats and the draw-off of excessive amounts of the principal liquid phases.

It is the principal object of the invention to provide an improved settler having a paddle arranged to sweep the interface and thereby provide a freshly swept interface through which the liquid phases can settle effectively. Specifically, it is an object to promote coalescence of the dispersed phase at the interface, and/or to remove from the settler the rag which is swept away from the interface by the paddle, and thereby permit the principal phases to settle with little or no hindrance from the rag layer.

A further object is to promote the effectiveness of the installation by removing with the rag a smaller quantity of the principal phases than in the prior arrangements, as by providing one or more rag-intake openings only at points where the rag is concentrated and, in certain embodiments, by recurrently opening and closing the flow of liquid through said opening or openings in synchronism with the movement of the paddle so as to draw in liquid only when a body of rag appears at the intake opening or openings.

In summary, the settler according to the invention includes a vessel to which a mixture of principal liquid phases is supplied and within which they are settled into layers, provided with a paddle which is movably mounted to sweep the interface between the settled principal phases and means for moving the paddle. When constructed to remove rag, the paddle is shaped to collect the rag during the sweeping movement and the settler includes draw-off means situated at the interface level for discharging the concentrated rag. Although the invention is not restricted thereto, it is convenient to mount the paddle horizontally on a rotatable vertical shaft, and to give the paddle a channel-shaped cross section to form a rag-collecting pocket. The outline of the paddle, when viewed in plan, may be curved so as to effect movement of the collected rag along the arm toward the rag-intake opening, which may be situated at the axis of rotation and/or at the wall of the vessel. According to a variant which does not require a curved paddle arm, the latter contains a bore communicating with a draw-off pipe and has a plurality of rag-intake openings distributed along the length thereof in communication with said bore.

When one or more rag-intake openings are situated at the periphery of the settler and the latter is provided with a paddle which moves past the openings at intervals, it is desirable to provide valve means for each of said openings and means to open said valves in timed relation to the passage of the paddle, so as to permit liquid flow through the openings only when a body of rag has been accumulated opposite them.

In a specific application of the settler, it forms the internal settler at the top or bottom of a rotating disc contactor wherein two liquids flow countercurrently to one end of it and the resulting dispersion flows vertically into the settler. In this application all of the dispersed phase, which gravitates toward the end of the contactor at which the settler is situated, must flow through the interface and the sweeping thereof in accordance with the invention promotes the smooth operation of the contactor as a whole.

The invention will be further described with reference to the accompanying drawings forming a part of this specification and illustrating three specific embodiments by way of example, wherein:

Figure 7 is an elevation view of a paddle arm according to a modified construction, parts being shown in section;

Figure 8 is a plan view of Figure 7;

Figure 9 is a transverse sectional view taken on the line 9—9 of Figure 7;

Figure 10 is an elevation view of a settler showing a modified construction;

Figure 11 is a transverse sectional view taken on the broken line 11—11 of Figure 10;

Figure 12 is a fragmentary sectional view taken on the line 12—12 of Figure 11; and Figure 13 is a fragmentary sectional view taken on the line 13—13 of Figure 12.

Figure 1:
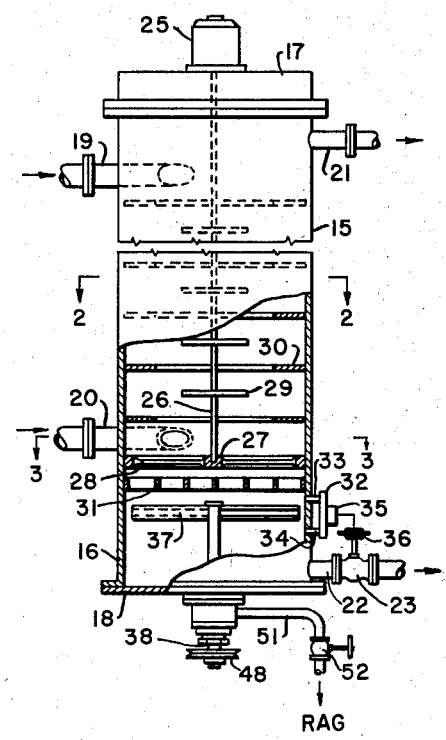
Figure 1 is an elevation view of a rotating disc contactor to which the invention has been applied, parts being broken away.
Figure 4:
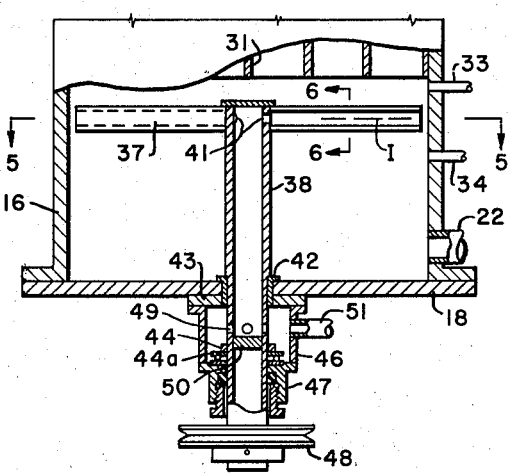
Figure 4 is an enlarged, vertical sectional view of the bottom of Figure 1.
Figure 2:
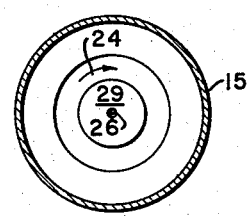
Figures 2 and 3 are transverse sectional views taken on the correspondingly numbered lines of Figure 1.

Referring to Figures 1–6, the contactor includes a vertical cylindrical shell 15 the lower part 16 of which constitutes the settler according to the invention. The shell is provided with top and bottom closures 17 and 18, respectively, upper and lower inlets 19 and 20 for the heavier and lighter liquids, respectively, an upper discharge opening 21 for the contacted lighter liquid, and a lower discharge opening 22, controlled by valve 23, for the contacted heavier liquid. The inlets 19 and 20 may optionally be disposed tangentially, as shown, to admit the liquids in a circumferential direction which is the same as the direction indicated by the arrow 24 in which a motor 25 rotates a vertical shaft 26. Shaft 26 is rotatably mounted in the closure 17 and in a bearing block 27 supported by a spider 28 and carries a plurality of vertically spaced rotor discs 29 and situated wholly within the compartments defined by annular stator baffles 30, which have central circular openings therein, preferably larger than the diameters of the discs 29. An egg-crate structure 31 may be mounted between the inlet 20 and the settling section 16 for arresting horizontal currents of the liquids and thereby promoting quiescent conditions in the settler. The settler is preferably provided with a liquid level-sensing device 32, having connections 33 and 34, respectively, above and below the intended level of the interface I (Figure 4). This sensing device is preferably connected to a controller 35 and a valve actuator 36, by which the efflux of settled heavy liquid through the pipe 22 is controlled so as to maintain the liquid interface at the level I.

The foregoing description is applicable to a contactor in which the heavier phase is dispersed within the lighter phase, which constitutes the continuous phase. Such a condition is effected by first filling the vessel with the lighter liquid and thereafter admitting the heavier liquid while operating the motor 25. This results in the formation of toroidal vortices within each of the compartments between the stator baffles 30, from which vortices portions of the liquid phases gravitate between compartments in opposed directions. (Reference is made to U.S. Patents Nos. 2,601,674, 2,729,544, and 2,729,545 for further details on the construction, dimensions, and flow patterns produced.) Substantially only the continuous, lighter phase rises to the level above the inlet 19. The dispersion, containing both liquid phases, flows downwards through the egg-crate structure 31 into the settler 16; however, the net flow of liquid therethrough is only that of the dispersed heavier phase, which settled through the interface I into the bottom of the vessel because any lighter phase entering the settler rises again through the structure 31.

Figure 5:
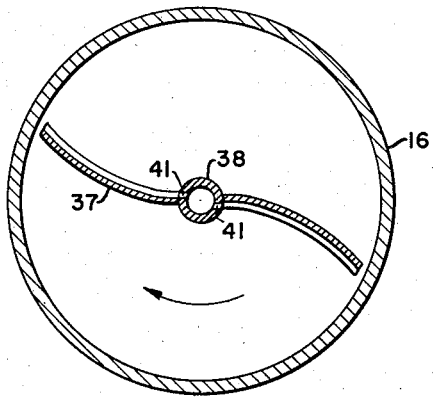
Figure 5 is a transverse sectional view taken on the line 5—5 of Figure 4.
Figure 3:
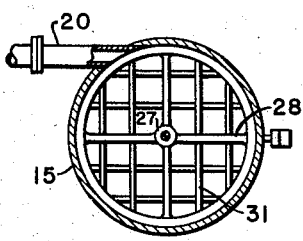
Figure 6:
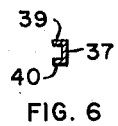
Figure 6 is a sectional view taken on the line 6—6 of Figure 4.

Considering next the improvement according to the invention, the settler 16 contains a double-armed, rag-collecting paddle 37 mounted at the top of a rotatable, capped, vertical pipe 38 for rotation therewith. The paddle arms are advantageously shaped as indicated in Figure 5, so that any ray drawn from the axis of rotation to the arms make an acute interior angle with the horizontal, forwardly projecting normal to the arm. The cross section of the arms, when used to remove rag, is preferably channel-shaped, as shown in Figure 6, including upper and lower, forwardly extending flanges 39 and 40, to form a rag-collecting pocket. The pipe 38 has a pair of rag-intake openings 41 located at the inner ends of the arms to receive rag which is advanced toward the pipe along the said pockets. The pipe 38 is journalled by means of a bearing 42 extending through the closure 18 and a plate 43; it is carried by a collar 44 which is rotatably supported from the floor of a chamber 46 by suitable means, such as a bearing 44a. The shaft extends through the floor and is sealed thereto by packing secured by a gland 47; it carries suitable drive means, such as a pulley 48, for effecting slow rotation thereof. The pipe has radial holes 49 communicating with the chambers 46 and is closed by a plug 50 beneath these holes. Rag is discharged from the chamber 46 through a pipe 51 controlled by a valve 52. The rag-discharging elements may be omitted when the paddle is used merely to promote coalescence.

In operation, the pipe 38 is rotated slowly, so as not to agitate the interface. The controller 35 maintains the interface level I between the flanges 39 and 40, so that the paddle sweeps the interface, to promote coalescence. When used in a liquid system wherein a rag is formed, the paddle engages the rag and maintains the interface clear. Because of the curved outline shown in Figure 5 and described above, the rag moves inwards along the arms toward the openings 41, whence they move through the pipe 38 and the chamber 46 to a pipe 51.

The invention is, of course, not limited to the above example wherein the heavier phase is dispersed and the settler is at the bottom of the contactor. Thus, when the lighter phase is dispersed, the egg-crate structure 31, settler 16 and paddle 37 are at the top of the contactor. In this case, the shaft 26 extends through the pipe 38 in sealed relation or is driven from the bottom.

Referring to Figures 7–9, there is shown a modified construction employing a single-armed paddle 53 mounted at the top of a capped, vertical pipe 38a, the latter being mounted for rotation as previously described for the pipe 38. In this embodiment, the arm includes a pipe 54 the bore of which communicates with the interior of pipe 38a and which has a plurality of openings 55 in the front thereof, having regard to the direction of rotation. These openings are advantageously horizontally elongated and spaced at intervals which are inversely proportional to the distance from the axis of the pipe 38a so as to provide rag-intake openings the areas of which are in proportion to the areas swept by various portions of the arm. A rag-collecting pocket is formed at the front of the arm by a shroud 56, which may be a piece of sheet metal shaped as a horizontal U, as shown, and fastened to the pipe 54. Operation of this embodiment is as previously described with the difference that the rag enters the pipe 54 through the several openings 55 and need not be moved along the length of the arm externally thereof for distances greater than the intervals between the openings 55; the arm need not, therefore, be curved.

Figures 10–13 show an embodiment of the invention wherein the separator is independent of the contacting apparatus and wherein the rag is discharged at the peripheral wall. In these views the settler includes a cylindrical upright wall 60 fitted with top and bottom closures 61 and 62, respectively, with an inlet 63 and outlets 64 and 65 for the settled lighter and heavier liquids, respectively. The latter outlet is advantageously fitted with a flow-control valve 66 having an actuator 67 connected by a control line 68 to a liquid lever-controller 69. The controller is operatively attached to a liquid-interface level-sensing device 70, whereby the interface level is maintained at the level I (Figure 12).

The rag-removal means includes a rag-collecting paddle arm 71 and a plurality of collecting chambers 72–75 which communicate with the interior of the vessel through horizontal slots 76 in the wall 60 located at the level of the interface I. The paddle arm is fixed on a vertical shaft 77 which is journalled at the central axis of the vessel and carries a drive pulley 78 by which it may be rotated slowly. The arm 71 may have the cross sectional shape shown in Figure 6; the curvature, when viewed in plan, is however opposite that of Figure 5, so that rag is caused to move outwardly, toward the vessel wall, when the arm is rotated in the direction of the arrow A. Any desired number of slots 76 may be provided; they preferably extend circumferentially over relatively small arcs, such as 10°–15° (Figure 13).

It is desirable to permit flow of liquid through the slots 76 into the collecting chambers only when rag has been concentrated opposite them, i.e., starting shortly prior to the arrival of the end of the paddle arm 71 at the near edge of the slot and ending when or shortly before the arm passes the far end of the slot. To this end, each collecting chamber is provided with an outlet pipe 79 which is connected to a manifold 80 through a normally-closed valve 81. These valves are, for purposes of illustration, represented as being actuated to open position by the depression of push rods 82, which are normally urged upwardly by resilient springs (not shown); these springs are parts of the valves. The shaft 77 carries a cam 83 which has one lobe for each paddle arm (one in this instance) and which actuates cam-follower levers 85—88. The followers are pivoted on vertical pins 89 and the outer ends thereof engage the upstanding arms 90 of bell crank levers, the horizontal arms 91 of which engage the upper ends of the rods 82. The bell crank levers are pivotally mounted on horizontal pins 92 journalled in brackets 93. The manifold 80 is connected to a rag-discharge pipe 94.

In operation, the several cam followers are pressed against the cam 83 by the action of the push rods 82, which are in turn urged resiliently upwards by the valve springs. When the shaft 77 is rotated the cam lobe 84 rocks the cam followers successively, as indicated for the follower 85; this rotates the bell crank levers in succession to depress the push rods 82 and opens the corresponding valves 81 intermittently and in timed relation to the passage of the paddle arm 71 past the rag-intake slots 76.

I claim as my invention:

1. Apparatus for settling the phases of a liquid-liquid dispersion containing a minor amount of a rag-forming substance, comprising: a settling vessel adapted to contain said liquid phases separated by an interface which lies at an intermediate level of the vessel; means for supplying said dispersion to the vessel; means for discharging said phases separately at levels situated respectively above and below said intermediate level, including flow-control means responsive to the position of said interface for maintaining the interface at the said intermediate level; a rag-collecting paddle at said intermediate level movably mounted for horizontal motion to sweep said interface, said paddle including an arm which is vertically extended to engage the said rag and the transverse section of which is concave toward the direction of movement of the paddle to form a rag-collecting pocket; means for actuating said paddle to effect the said sweeping movement; and outlet means at the said intermediate level for discharging the collected rag from the interface.

2. Apparatus according to claim 1 wherein said outlet means includes a rag-intake opening situated at one end of the said arm and the said arm has an outline in plan such as to cause travel of the collected rag along said pocket toward said intake opening.

3. Apparatus according to claim 1 wherein said settling vessel is the terminal part of a contactor, situated at one vertical extremity thereof, the said contactor including a vertically elongated vessel within which are mounted a plurality of stator baffles having central openings, a central shaft extending through the several openings, and a plurality of rotor baffles distributed along the length of said shaft, said contactor having further inlet means for admitting liquids to be contacted at vertically spaced points situated in a common vertical direction in relation to said settling vessel.

4. Apparatus according to claim 1 wherein said paddle includes a horizontal arm mounted for rotation about a vertical axis, said outlet means includes a draw-off pipe at the said vertical axis, and a passageway interconnecting said draw-off pipe with the interior of the vessel at the said intermediate level.

5. Apparatus according to claim 4 wherein said interconnecting passageway includes rag-intake openings situated in the vicinity of the juncture of the paddle and the pipe.

6. Apparatus according to claim 4 wherein said interconnecting passageway includes a bore extending through said paddle arm and communicating at one end with said pipe, said arm having rag-intake openings distributed along the length thereof in communication with said bore.

7. Apparatus according to claim 1 wherein said paddle includes a horizontal arm mounted for rotation about a vertical axis near the center of the vessel and extending to the vicinity of the vessel wall, and said outlet means includes at least one rag-intake opening in the said vessel wall at the said intermediate level.

8. Apparatus according to claim 7 wherein said opening is provided with a valve, in combination with means for opening and closing said valve intermittently in timed relation to the passage of said paddle arm near said opening.

9. Apparatus according to claim 8 including a plurality of openings distributed about the periphery of the vessel, each said opening having an individual valve and means for opening and closing the respective valve in timed relation to the passage of the paddle to the discharge openings controlled thereby.

References Cited in the file of this patent

UNITED STATES PATENTS

| | | |
|---|---|---|
| 1,297,171 | Holley et al. | Mar. 11, 1919 |
| 2,121,324 | Manley | June 21, 1938 |
| 2,143,441 | Jacobs | Jan. 10, 1939 |
| 2,672,406 | Carney | Mar. 16, 1954 |
| 2,729,549 | Reman et al. | Jan. 3, 1956 |

FOREIGN PATENTS

| | | |
|---|---|---|
| 19,249 | Great Britain | July 9, 1898 |
| 642,586 | France | May 6, 1928 |